May 10, 1955 S. RUBEN 2,708,242
RADIATION DOSIMETER
Filed June 28, 1952 2 Sheets-Sheet 1
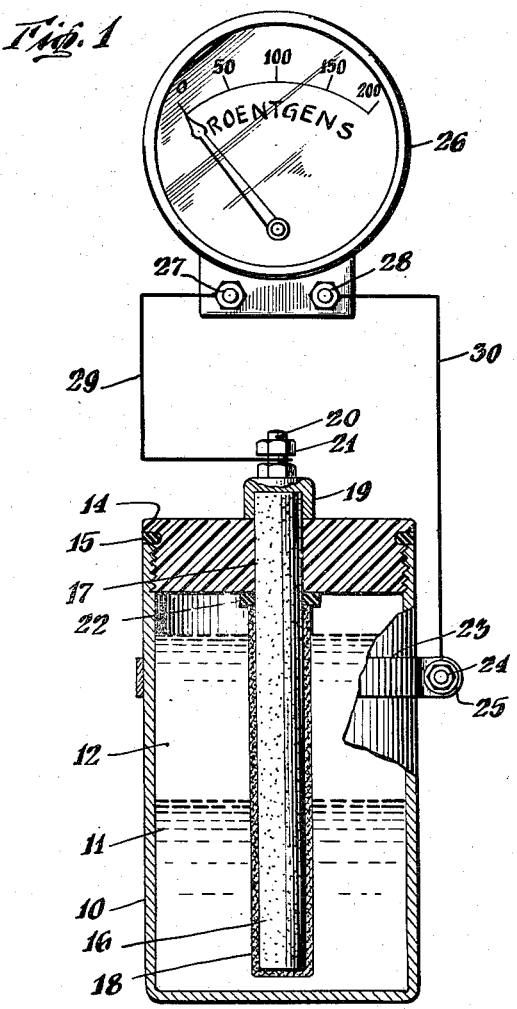
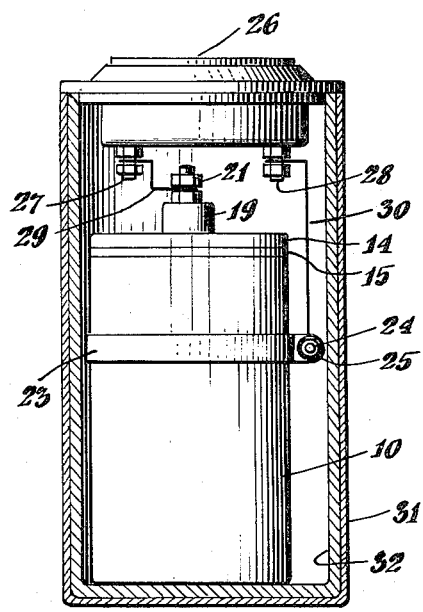
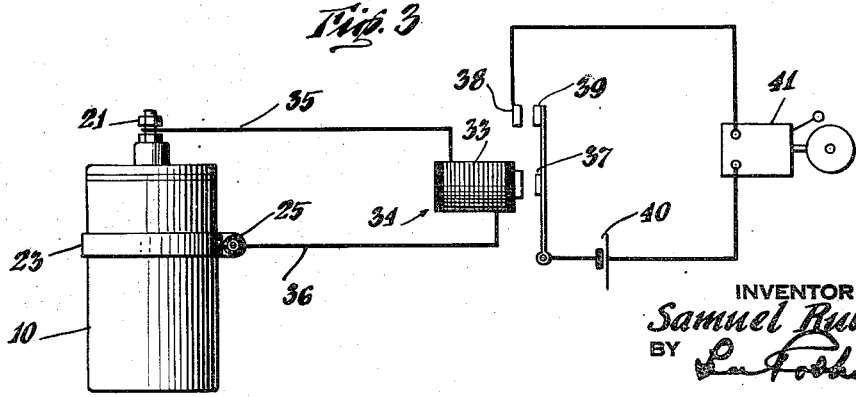
INVENTOR
Samuel Ruben
BY
ATTORNEY May 10, 1955

S. RUBEN 2,708,242

RADIATION DOSIMETER

Filed June 28, 1952

INVENTOR
Samuel Ruben
BY
ATTORNEY

United States Patent Office 2,708,242
Patented May 10, 1955

2,708,242

RADIATION DOSIMETER

Samuel Ruben, New Rochelle, N. Y.

Application June 28, 1952, Serial No. 296,209

9 Claims. (Cl. 250—83.3)

This invention relates to a dosimeter for indicating the amount of radiation absorbed thereby and to a novel electrochemical cell which is normally inactive but becomes activated and develops a potential upon exposure to high energy gamma radiation.

With the increasing use of X-rays and particularly of atomic reactions both in peace and war, the problem of accurately measuring the amount of high energy radiation to which a person or a certain location has been exposed is of considerable importance. As exposure to high energy radiation may cause serious physiological changes, prolonged illness and even fatal injuries, a prompt and accurate indication of the radiation cumulatively received makes it possible to withdraw from such endangered location before an injurious dose has been absorbed or, if exposure could not be prevented, to initiate medical treatment before the direct effects of the exposure appear in their graver form. The need for a simple, portable and inexpensive device of the described character has existed for some time.

It is an object of the present invention to improve radiation dosimeters.

It is another object of the present invention to provide a simple portable device for accurately indicating cumulative exposure to high energy radiations, such as are produced by X-rays and by atomic reactions.

It is a further object of the invention to provide a radiation responsive system including a cell which is normally inactive in the absence of radiation but becomes activated in response to radiation exposure to produce an electrical potential which then may be utilized for giving a quantitative or qualitative indication, such as deflecting a meter or sounding an alarm.

The invention also contemplates a self-contained, portable radiation dosage indicator or dosimeter of high accuracy which is relatively small and light, simple in construction and operation and which may be readily manufactured on a quantity production scale at a low cost.

Other and further objects and advantages of the present invention will become apparent from the following description, taken in conjunction with the accompanying drawing, in which:

Fig. 1 is a vertical sectional view, having parts in elevation, of a radiation dosimeter embodying the principles of the present invention;

Fig. 2 is a similar view of a modified embodiment of the invention;

Fig. 3 is a circuit diagram of a practical installation utilizing the radiation-responsive cell of the invention in an automatic alarm system.

Figure 4:
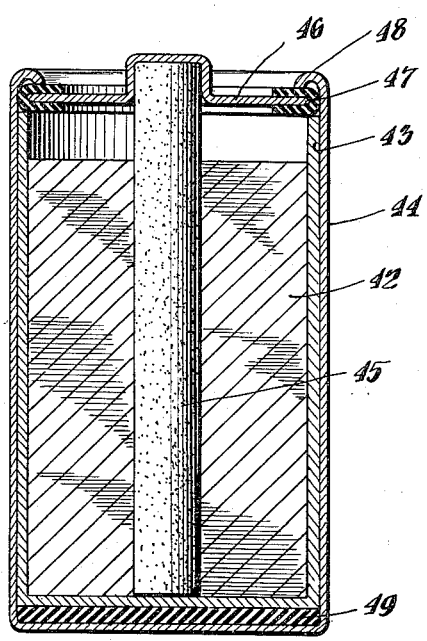
Fig. 4 is a vertical sectional view of another modified embodiment of the invention.

The radiation dosimeter of the present invention utilizes the prior observation of Guenther, P., Von der Host, H. D., and Cronheim, G. F., Electrochem. 34, 616–625, 1928, that a water-saturated chloroform solution evolves acids, specifically hydrochloric acid, in linear proportion to the amount of radiation absorbed. This known principle was somewhat improved upon by other investigators who added pH indicator dyes to the solution to colorimetrically indicate when a predetermined radiation dosage had been received (Symposium IV, Chemistry and Physics Radiation Dosimetry, Army Chem. Center, Md., 1950, G. Taplin, C. Douglas, B. Sanchez.)

Broadly stated, in accordance with the present invention, the acid liberating characteristics of chloroform solutions upon exposure to radiation is utilized to electrically activate a galvanic couple or cell comprising a pair of electrodes immersed in the solution. In the normal condition of the cell, that is in the absence of radiation, the solution is un-ionized and neutral so that there is no potential difference between the electrodes. Upon exposure to radiation, hydrochloric acid is liberated in the solution which then becomes an increasingly acidic electrolyte in accordance with the amount of radiation received and will produce a potential at the electrodes. It is of considerable importance that both the chloroform and the water be as pure chemically as possible so that the system is inactive under normal conditions.

The preferred anode materials for the radiation responsive cell of the invention are magnesium, aluminum, zinc, cadmium, or mercury which are advantageously used in combination with an insoluble cathode, such as one of carbon or graphite. As the cell will be called upon to deliver current for the indicating device, it is necessary to provide a layer of suitable depolarizer material on the cathode, such as manganese dioxide, or an oxide of silver, copper or lead, manganese dioxide being preferred as it provides the greatest stability.

The galvanic couple which provides the highest potential comprises a magnesium electrode in the form of a container or shell which is preferably chromated at least on its inner surface to reduce shelf action and the effects of any residual impurities, and a graphite rod on which there is electro-deposited an integral layer of manganese dioxide. This layer may be formed by anodic deposition from a manganous sulfate sulfuric acid solution, the deposit being washed thoroughly to remove any residual impurities. The container or shell is filled up to a certain level with a body or layer of water-saturated chloroform solution upon which there is superimposed another body or layer of chemically pure water. On exposure to radiation, any acid produced is diffused into the aqueous layer immediately causing sufficient ionization to allow indication of a current flow on a meter or to operate a relay connected to the cell.

The electrochemical cell reactions in the cell, when HCl is photochemically liberated by the chloroform, may be represented as follows:

At the anode:

$$Mg \rightarrow Mg^{++} + 2e$$
$$2HCl = 2H^+ + 2Cl^-$$
$$Mg^{++} + 2Cl^- \rightarrow MgCl_2$$

At the cathode:

$$2H^+ + 2e = 2H$$
$$2H + 2MnO_2 \rightarrow Mn_2O_3 + H_2O$$

A maximum potential of 2.3 volts is generated by the cell upon exposure to radiation. The external indication of a meter will, of course, depend upon the internal resistance of the cell and on the sensitivity and internal resistance of the meter connected to the cell. The potential drop due to the internal resistance of the cell will decrease with increasing conductivity of the solution due to the increase in ionic components by the radiation effect on the chloroform. The magnitude of these ionic components may be noted from the reported fact that a dosage of 500 Roentgen units with radium will produce $50 \times 10^{-6}$ milliequivalents of HCl from 5 cc. of chloroform and with 250 kv. rays will produce $240 \times 10^{-6}$ milliequivalents of HCl from the same quantity of chloroform.

By the use of suitable shields, such as shields formed of lead or copper, the system may be shielded from soft or low energy radiations and made selectively responsive to gamma radiations of 2–3 m. e. v. By proper control of electrode spacing, cell volume and of the constants of the external electrical indicating circuit, the system can be readily adjusted to indicate dosages of 1 to 1000 Roentgens or higher.

In order that those skilled in the art may have a better understanding of the invention, reference may be had to Fig. 1 of the drawing, illustrating a preferred form of the novel radiation sensitive galvanic cell of the invention combined with a meter. Reference numeral 10 denotes a magnesium container or shell, at least the inner surface of which is chromated, constituting the anode of the cell. Container 10 is partially filled with a layer 11 of a water-saturated chloroform solution above which there is provided an aqueous layer 12, such as one of chemically pure water, the said layers remaining separated from each other as a result of the difference in their respective specific weights. The cell is closed by a plastic top 14 having a threaded connection with container 10, fluid-tight closure being assured by means of an interposed polyethylene sealing ring or washer 15.

A graphite rod 16 extends through an opening 17 in plastic top 14 and constitutes the cathode of the cell, the portion of said rod below the plastic top being coated with a layer 18 of manganese dioxide. As set forth in the foregoing, this layer is produced by anodic deposition from a manganous sulfate sulfuric acid solution after which the rod is boiled in repeated quantities of distilled water to eliminate impurities due to the deposition electrolyte. A brass cap 19 is forced over the uncoated end of rod 16 and is provided with a threaded extension 20 which together with a nut 21 on said extension constitutes the positive terminal of the cell. A second polyethylene washer 22 may be arranged between the lower face of plastic top 14 and the portion of rod 16 where the coating 18 ends to prevent leakage of liquid through opening 17. The negative terminal of the cell is constituted by a metal strap 23 clamped around the exterior of container 10 by means of a bolt 24 and associated nut 25.

An indicating meter 26 calibrated in Roentgens has its terminals 27 and 28 connected to the positive and negative terminals of the cell by means of lead wires 29 and 30, respectively. This meter may be of the microampere type or of a different sensitivity, depending upon the range of radiation effect that is to be indicated.

While magnesium is preferable for maximum voltage indication, other anodic materials can be used, such as zinc, which gives a potential of 1.75 volts, amalgamated cadmium, aluminum, or mercury. For many applications, an amalgamated zinc container is preferred. The depolarizer may be a material other than manganese dioxide, such as an oxide of silver, copper, or lead, although manganese dioxide is preferred as it assures maximum stability.

Fig. 2 illustrates a modified embodiment of the invention which is closely similar to the one described in connection with Fig. 1, except for the fact that meter 26 and the cell are enclosed in a shielded container comprising an outer steel can 31 and an inner lining of lead 32 in order to make the system more selective to higher energy radiation. Meter 26 is mounted horizontally and fits the opening of the lead-lined steel can 31, 32. In view of the close similarity in construction and as similar reference numerals have been used to denote corresponding parts, the operation of this modified embodiment of the invention will be readily understood by those skilled in the art without any further explanation. When magnesium is used as the cell container up to high hydrochloric acid quantities, it is desirable to provide a vent in the container through which any excess hydrogen generated at the anode may be released.

Fig. 3 illustrates an alarm system in which the radiation responsive cell of the invention can actuate a bell, or, for remote indication, a radio transmitter when a predetermined dosage had been absorbed. It will be noted that terminals 21 and 25 of the cell are directly connected to coil 33 of a sensitive relay 34 by means of lead wires 35 and 36, respectively. Upon absorption of the said dosage, coil 33 of relay 34 will be energized to an extent sufficient to attract armature 37, closing relay contacts 38 and 39. This will complete the alarm circuit comprising battery 40, bell 41 and the said contacts 38 and 39, sounding an alarm.

Fig. 4 illustrates a further modified embodiment of the invention particularly suitable for portable applications in the form of a dry cell which is free from the effects of position and assures more reliable venting. In this cell, the chloroform having a saturated aqueous content is added to a mixture of manganese dioxide and graphite to form a bobbin. This bobbin is within a zinc container, a paper spacer being interposed between and is in contact with the bobbin and the inner surface of the container. The paper spacer is saturated with water having the maximum chloroform content as determined by the solubility of chloroform in water which is 1 ml. of chloroform per 200 ml. of water. All of the initial materials, such as the manganese dioxide, the graphite and the paper, are thoroughly washed to eliminate all free ionic components.

Referring now to Fig. 4, showing a cell of a size similar to conventional dry cells, reference numeral 42 denotes the bobbin composed of 65% by weight manganese dioxide and 35% by weight of Madagascar graphite and mixed with the water-saturated chloroform solution in the proportion of 45 grams of the manganese dioxide-graphite mixture for 10 cc. of the said solution. Bobbin 42 is in pressure contact with washed absorbent paper liner 43 which contains 2 cc. water in which ½ cg. of chloroform has been dissolved. Liner 43 is in pressure contact with the inner surface of a zinc container 44. The zinc container is slightly amalgamated by immersion in a hot ammonium chloride solution containing mercuric chloride, to reduce shelf action thereon by the water-chloroform solution. Preferably, the mercury content of the container after amalgamation is kept at a value of about 2% to avoid excessive embrittlement of the zinc.

A porous carbon rod 45 is forced through bobbin 42 and has its upper end in pressure contact with the dished center portion of a top closure disc 46 of tinned steel or brass having a polyethylene grommet 47 around its circumferential edge. The cell is sealed by rolling or crimping the top edge of zinc container 44 against the said grommet. In the slight amalgamation of the zinc container, it is desirable to avoid amalgamation of the top portion thereof in order to prevent embrittlement of the container in the region of the crimp. A disc 49 of inert insulating material is placed in the bottom of the zinc container to prevent electrical contact between the bobbin and the container. The seal provided by this form of construction is of such character that it permits diffusion of any hydrogen gas that may be generated during operation of the cell.

In operation, when the cell is exposed to gamma radiation, the chloroform evolves hydrochloric acid in accordance with the equation $$CHCl_3 + h\nu \rightarrow CCl_2 + HCl$$

in which the symbol $h\nu$ denotes the photochemical energy absorbed. The released hydrochloric acid diffuses into the water saturated layer of paper which becomes ionized and forms an electrolyte in the paper thereby providing in combination with the bobbin and with the zinc container a current and voltage source adapted to actuate an indicating or control instrument.

Although the present invention has been disclosed in connection with a few preferred embodiments thereof, variations and modifications may be resorted to by those skilled in the art without departing from the principles of the invention. I consider all of these variations and modifications to be within the true spirit and scope of my invention, as disclosed in the foregoing description and defined by the appended claims.

I claim:

1. A radiation responsive system comprising, in combination, a cell, and an electrical device responsive to the output of said cell; said cell comprising an anode and a cathode of electrochemically dissimilar elements, and a normally un-ionized chloroform-water mixture interposed between and in contact with said anode and cathode.

2. A radiation responsive system comprising, in combination, a cell, and an electrical device responsive to the output of said cell; said cell comprising an anode and a cathode, a layer of depolarizing material on said cathode, and a normally neutral and un-ionized water-saturated chloroform solution interposed between said anode and cathode, said solution being neutral in the absence of radiation and liberating hydrochloric acid upon exposure to radiation thereby producing a potential difference between said electrodes in response to radiation.

3. In a system for the measurement of radiation intensity, the combination of an electrochemical device comprising an anode selected from the group consisting of magnesium, zinc, cadmium and mercury, a carbon cathode having a depolarizer layer thereon, and a normally neutral and un-ionized chloroform-water mixture interposed between and in contact with said electrodes; with means responsive to the output of any device.

4. In a system for the measurement of radiation intensity, the combination of an electrochemical device comprising an anode shell of magnesium, a carbon cathode having a layer of manganese dioxide thereon in said shell, and a body of normally neutral and un-ionized water-saturated chloroform solution in said shell in contact therewith and with said cathode, said device being operative to produce a potential upon exposure to radiation; with means responsive to such potential.

5. A radiation indicator which comprises, in combination, a galvanic cell including dissimilar electrodes and a body of normally neutral and un-ionized water-saturated chloroform solution interposed between said electrodes, said solution being ionized in response to radiation, a shielding compartment enclosing said cell to render the same selectively responsive to high energy gamma radiation, and means operable by the output of said cell.

6. A radiation indicator which comprises a magnesium shell having a chromated inner surface, a graphite rod in said shell and spaced therefrom having a layer of manganese dioxide thereon, and a body of normally neutral and un-ionized water-saturated chloroform solution in said shell in contact with the shell and with said manganese dioxide layer, said solution being converted into an acidic solution in cumulative response to the effect of radiation thereby producing a potential between said shell and said rod; and a current responsive device connected between said shell and said rod.

7. A radiation dosimeter which comprises a galvanic cell including electrochemically dissimilar elements separated by a normally un-ionized water-saturated chloroform solution which liberates ions under the influence of radiation thereby activating said cell, an electrical indicating device responsive to the output of said cell, and a metal shielding compartment adapted to absorb low energy radiation enclosing at least said cell to render said indicating device selectively responsive to the cumulative effect of high energy gamma radiation.

8. A radiation detection system comprising, in combination, a radiation-responsive cell, and a device responsive to the electrical output of said cell; said cell comprising a metal shell, a depolarizer bobbin in said cell, a porous liner interposed between and in contact with said shell and said bobbin, and a normally un-ionized chloroform-water mixture impregnating said bobbin and said liner.

9. A radiation detection system comprising, in combination, a radiation-responsive cell, and a device responsive to the electrical output of said cell; said cell comprising an amalgamated zinc shell, an inert terminal rod in said shell, a depolarizer bobbin around said terminal including a mixture of manganese dioxide and graphite, a porous liner interposed between and in contact with said shell and said bobbin, and a normally un-ionized chloroform-water mixture impregnating said bobbin and said liner.

References Cited in the file of this patent

UNITED STATES PATENTS

| | | |
|---|---|---|
| 1,662,866 | Salazar | Mar. 20, 1928 |
| 1,978,624 | Colloseus | Oct. 30, 1934 |
| 2,279,575 | Lawson | Apr. 14, 1942 |
| 2,403,571 | Wilke | July 9, 1946 |
| 2,445,306 | Lawson | July 13, 1948 |
| 2,547,908 | Fry et al. | Apr. 3, 1951 |

FOREIGN PATENTS

| | | |
|---|---|---|
| 510,581 | Germany | Oct. 20, 1930 |

OTHER REFERENCES

A Note on the Effect of Gamma Radiations on Chloroform—Bishop, Journal of Proceedings of Sydney, Australia, Technical College Chemical Society, vol. 5, 1933, pp. 66–68.

A New Electronic Battery—The Electrician, Oct. 31, 1924, page 497.

Chemical Dosimetry of Ionizing Radiations—Day et al., Nucleonics, February 1951, pp. 34–45.